(12) United States Patent
Ono et al.

(10) Patent No.: US 10,708,820 B2
(45) Date of Patent: Jul. 7, 2020

(54) APPARATUS AND METHOD FOR DATA DELIVERY IN DELAY-TOLERANT NETWORK (DTN)

(71) Applicant: NEC Corporation, Minato-ku, Tokyo (JP)

(72) Inventors: Masakazu Ono, Tokyo (JP); Shigeru Asai, Tokyo (JP); Kenji Wakafuji, Tokyo (JP); Hideto Shibohta, Tokyo (JP); Shingo Watanabe, Tokyo (JP); Masato Kudou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/217,160

(22) Filed: Dec. 12, 2018

(65) Prior Publication Data

US 2019/0116523 A1 Apr. 18, 2019

Related U.S. Application Data

(62) Division of application No. 15/324,035, filed as application No. PCT/JP2015/002673 on May 27, 2015, now Pat. No. 10,375,605.

(30) Foreign Application Priority Data

Jul. 24, 2014 (JP) .................. 2014-150407

(51) Int. Cl.
*H04W 28/14* (2009.01)
*H04W 28/10* (2009.01)
(Continued)

(52) U.S. Cl.
CPC ............. *H04W 28/14* (2013.01); *H04L 67/02* (2013.01); *H04L 67/34* (2013.01); *H04W 28/06* (2013.01); *H04W 28/10* (2013.01); *H04W 84/18* (2013.01)

(58) Field of Classification Search
CPC ........ H04L 67/02; H04L 67/34; H04W 28/06; H04W 28/10; H04W 28/14; H04W 84/18
See application file for complete search history.

(56) References Cited

U.S. PATENT DOCUMENTS 6,804,457 B1 * 10/2004 Miyashita ............ H04N 9/8042
375/E7.15
7,012,893 B2 3/2006 Bahadiroglu
(Continued)

FOREIGN PATENT DOCUMENTS

CN 102752799 A 10/2012
CN 102883397 A 1/2013
(Continued)

OTHER PUBLICATIONS

Extended European Search Report for EP Application No. EP15824390.7 dated Mar. 5, 2018.
(Continued)

*Primary Examiner* — Chi H Pham
*Assistant Examiner* — Weibin Huang

(57) ABSTRACT

A node in a DTN includes: a memory; and a processor coupled to the memory and configured to execute data transfer processing for the DTN, wherein the data transfer processing including: receiving a plurality of bundles to be transferred to a same destination node on the DTN, each of the plurality of bundles including any one of a plurality of data segments acquired by dividing data of a content; deleting a part of the bundles from among the plurality of bundles without transferring to any other node or compressing a data size of a payload of the part of the bundles in accordance with a communication status of the DTN; and transmitting either a rest of the bundles excluding the deleted part of the bundles or the plurality of bundles
(Continued)

including the part of the bundles having the compressed payloads to the DTN for transmitting to the destination node.

12 Claims, 8 Drawing Sheets

(51) Int. Cl.
*H04W 84/18* (2009.01)
*H04L 29/08* (2006.01)
*H04W 28/06* (2009.01)

(56) References Cited

U.S. PATENT DOCUMENTS

| | | | |
|---|---|---|---|
| 7,873,065 B1 | 1/2011 | Mukerji et al. | |
| 9,350,676 B2* | 5/2016 | Venkatachalam Jayaraman | ......... H04L 67/04 |
| 9,419,920 B1* | 8/2016 | Rohrer | ......... H04L 49/355 |
| 2004/0090989 A1 | 5/2004 | Kobayashi | |
| 2004/0237024 A1* | 11/2004 | Limberg | ......... H04L 1/0041 714/784 |
| 2005/0201383 A1 | 9/2005 | Bhandari et al. | |
| 2009/0046739 A1* | 2/2009 | Ebling | ......... G01D 21/00 370/465 |
| 2009/0129316 A1 | 5/2009 | Ramanathan et al. | |
| 2010/0125901 A1* | 5/2010 | Bathrick | ......... H04L 45/00 726/13 |
| 2010/0135415 A1 | 6/2010 | Song et al. | |
| 2010/0265951 A1 | 10/2010 | Fujita et al. | |
| 2011/0135021 A1 | 6/2011 | Hatakawa et al. | |
| 2011/0227757 A1* | 9/2011 | Chen | ......... G08G 1/0104 340/902 |
| 2011/0228716 A1 | 9/2011 | Xue et al. | |
| 2013/0111053 A1* | 5/2013 | Perreault | ......... H04L 67/2823 709/231 |
| 2013/0128987 A1 | 5/2013 | Visa et al. | |
| 2014/0032730 A1* | 1/2014 | Fall | ......... H04L 67/02 709/223 |
| 2014/0064180 A1 | 3/2014 | Kotecha et al. | |
| 2014/0160932 A1 | 6/2014 | Venkatachalam Jayaraman et al. | |
| 2016/0057116 A1* | 2/2016 | Charan | ......... H04L 63/0471 713/153 |

FOREIGN PATENT DOCUMENTS

| | | |
|---|---|---|
| EP | 0915592 A1 | 5/1999 |
| EP | 1475985 A2 | 11/2004 |
| EP | 1034642 B1 | 11/2009 |
| EP | 2139132 A1 | 12/2009 |
| JP | 2008-205890 A | 9/2008 |
| WO | 2014/092974 A1 | 6/2014 |

OTHER PUBLICATIONS

Vasco N. G. J. Soares et al., "Performance Analysis of Scheduling and Dropping Policies in Vehicular Delay-Tolerant Networks", Jul. 2011 (9 pages total).

Johannes Morgenroth et al., "Live Streaming in Delay Tolerant Networks", CHANTS'11, Sep. 23, 2011 (2 pages total).

Communication dated Jan. 30, 2018, Issued by the Korean Intellectual Property Office in counterpart Korean Application No. 10-2017-7004823.

Silva, B.M., Soares, V.N.G.J., Proenca, M.L., Rodrigues, J.J.P.C., "Impact of Content Storage and Retrieval Mechanisms on the Performance of Vehicular Delay-Tolerant Networks", Software, Telecommunications and Computer Networks (SoftCOM), 2010 International Conference on, Sep. 23, 2010, pp. 407-411.

S. Symington, "Delay-Tolerant Networking Previous-Hop Insertion Block", Internet Research Task Force (IRTF) Request for Comments: 6259, May 2011, pp. 1-10.

M. Demmer, J. Ott, S. Perreault, "Delay-Tolerant Networking TCP Convergence-Layer Protocol", Internet Research Task Force (IRTF) Request for Comments: 7242, Jun. 2014, pp. 1-22.

S. Perreault, J-P Dionne, "HTTP over Bundle Protocol for Delay-Tolerant Network (DTN)", Aug. 22, 2012, pp. 1-9.

International Search Report for PCT Application No. PCT/JP2015/002673, dated Aug. 25, 2015.

English translation of Written opinion for PCT Application No. PCT/JP2015/002673.

Chinese Office Action for CN Application No. 201580041006.6 dated Jun. 20, 2019 with English Translation.

Extended European Search Report for EP Application No. 18214341.2 dated on Apr. 11, 2019.

Notice of Allowance for U.S. Appl. No. 15/324,035 dated Mar. 29, 2019.

* cited by examiner

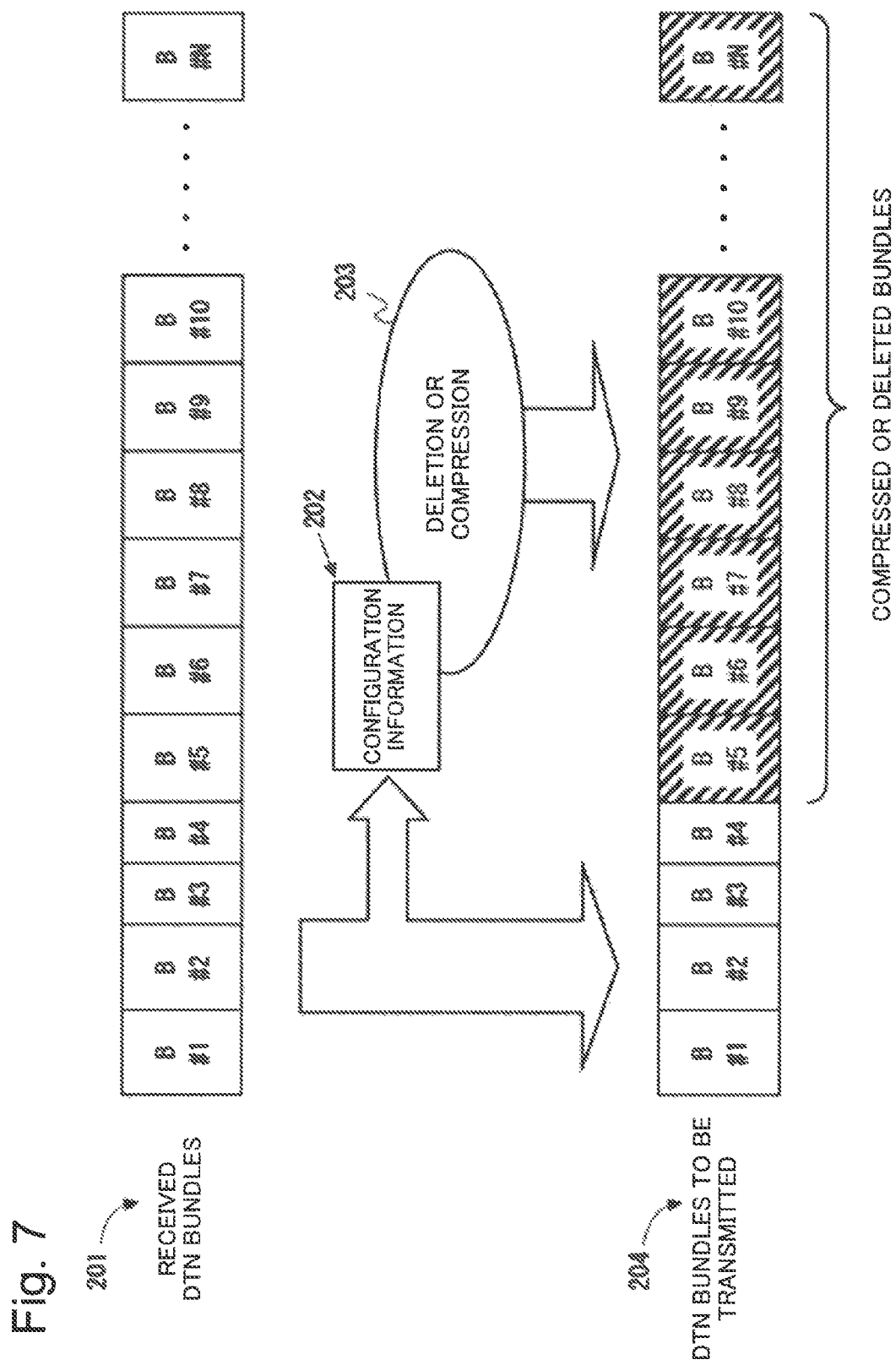

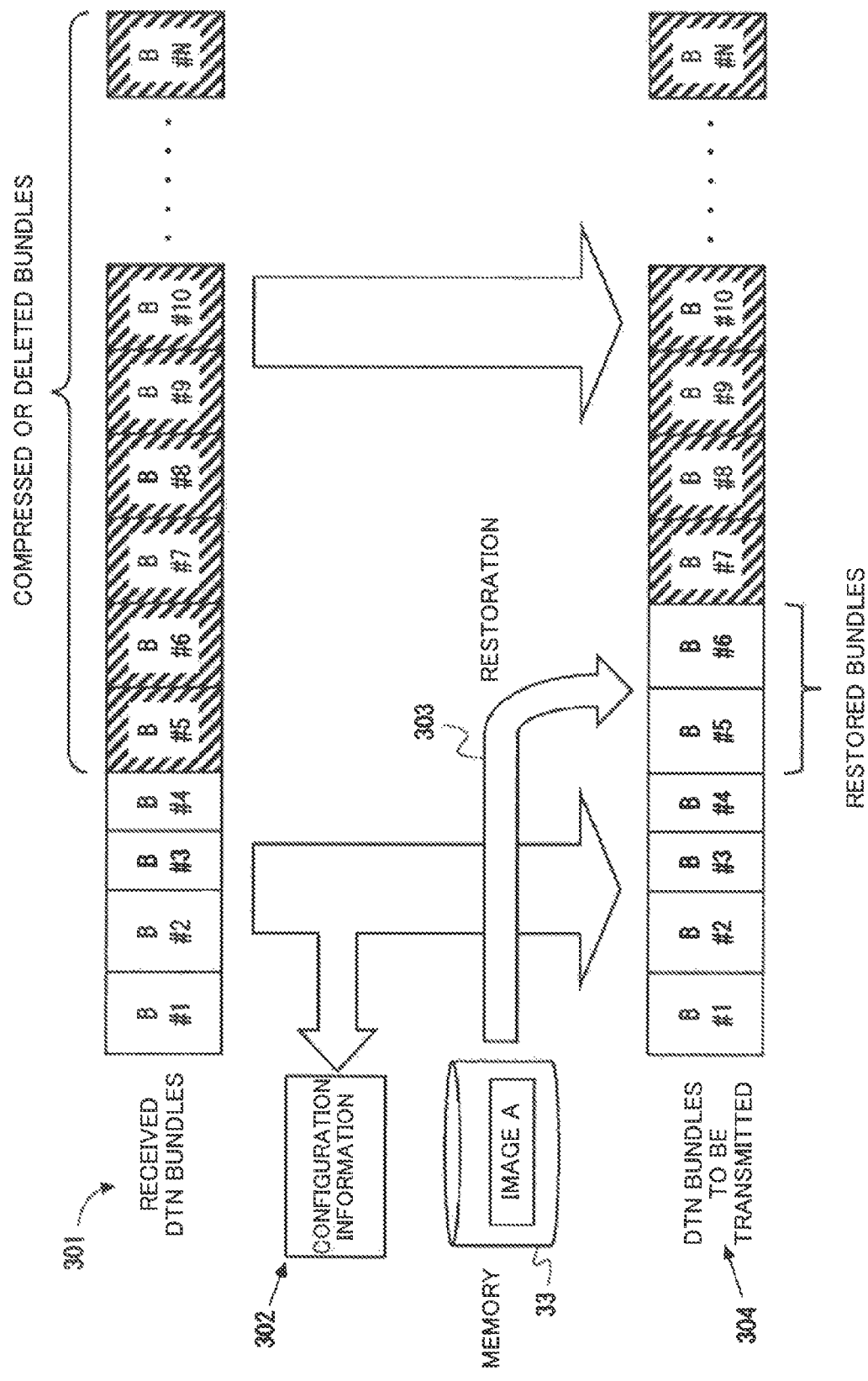

APPARATUS AND METHOD FOR DATA DELIVERY IN DELAY-TOLERANT NETWORK (DTN)

The present application is a divisional application of U.S. patent application Ser. No. 15/324,035 filed on Jan. 5, 2017, which is a National Stage Entry of PCT/JP2015/002673 filed on May 27, 2015, which claims priority from Japanese Patent Application 2014-150407 filed on Jul. 24, 2014, the contents of all of which are incorporated herein by reference, in their entirety.

TECHNICAL FIELD

The disclosure of the present description relates to a Delay/Disruption/Disconnect Tolerant Network (DTN), in particular, to data delivery in a DTN.

BACKGROUND ART

A Delay Tolerant Network is a wireless multi-hop network that includes a plurality of communication nodes. The Delay Tolerant Network can also be called as a Disruption Tolerant Network or a Disconnect Tolerant Network. In the present description, the Delay/Disruption/Disconnect Tolerant Network is collectively referred to as the DTN. The DTN presumes occurrences of temporary or intermittent communication disruptions. In other words, the DTN presumes no stable communication path between a transmission source node and a destination node at least at a certain point of time. In order to address temporary or intermittent communication disruptions, each node in the DTN (hereinafter, referred to as the DTN node) performs a store and forward operation. In the DTN, a plurality of DTN nodes achieve data delivery between a transmission source node and a destination node by autonomously relaying data bundles.

The bundle is a protocol data unit (PDU) of a bundle protocol. In the Open System Interconnection (OSI) reference model, the bundle protocol (a bundle layer) is located in between an application layer and a transport layer, and provides communications of a store and forward approach that is necessary for the DTN. One side or both sides of the transmission source node and the destination node for bundles may be a node belonging to the DTN (the DTN node) or a node belonging to another network (for example, the Internet). When one side or both sides the transmission source node and the destination node is(are) a node(s) belonging to another network, any one of the DTN nodes operates as a gateway or a proxy for relaying contents between the DTN and the another network.

PLT 1 discloses a proxy node that is disposed at a boundary between a DTN and an Internet Protocol (IP) network. The proxy node disclosed in PLT 1 receives, for example, IP packets relating to a Hypertext Transfer Protocol (HTTP) transaction (a web transaction) from an HTTP server, generates bundles that store the IP packets in payloads, and transmits the bundles to the DTN for transmitting to the destination node in the DTN.

PLT 2 discloses a DTN node that has a cache function. The DTN node disclosed in PLT 2 caches data (contents) included in the payloads of bundles that are delivered in the DTN. Subsequently, the DTN node exchanges lists of cached contents with other DTN nodes, thereby recognizes the contents cached in a plurality of the DTN nodes in the DTN.

CITATION LIST

Patent Literature

[PLT 1] US Unexamined Patent Application Publication No. 2013/0111053
[PLT 2] Japanese Unexamined Patent Application Publication No. 2008-205890

SUMMARY OF INVENTION

Technical Problem

The DTN presumes temporary or intermittent communication disruptions. Therefore, the communication status of the DTN is not uniform over the entire network, but often varies locally. In addition, the communication status of the DTN also largely varies over time. It should be noted that the communication status of the DTN may be, for example, communication quality (for example, Received Signal Strength Indicator (RSSI), Signal to Noise ratio (SNR), Bit Error Rate (BER), or throughput). Alternatively, the communication status of the DTN may be the delivery predictability of bundles. The delivery predictability of bundles is a metric used in a routing protocol for DTN, such as Probabilistic Routing Protocol using History of Encounters and Transitivity (PROPHET). The delivery Predictability, P (A, B), represents a probability in which DTN node A delivers bundles to DTN node B.

When the communication status of the DTN (for example, communication quality or delivery predictability) is locally degraded, failing delivery of a large amount of data (or a large number of bundles) to a destination node may be difficult. Further, even if the delivery succeeded, a lot of time may be required until completion of the delivery. As a proposal to address this problem, for example, it is considered that a proxy or a gateway may decrease the size of contents to be transmitted to the DTN (for example, compression of image data or video data, deletion of a part of data). With respect to data compression for a wireless network, a gateway that mediates the Internet and a cellular communication network often compresses image data.

However, this cellular communication network example presumes that the dispersion in local communication quality in the wireless network is small or the gateway can appropriately and consecutively recognize the quality of the wireless network. In contrast, as described above, the communication status largely varies over the DTN network in terms of location and time. In addition, because the DTN presumes no end-to-end stable communication path between the transmission source node and the destination node, it is difficult to recognize a local communication status (for example, communication quality or delivery predictability) in the DTN at a proxy or a gateway in an appropriate and timely manner. For this reason, it is not easy to determine an appropriate data compression rate at a proxy or a gateway in the DTN. Thus, for example, a proxy or a gateway in the DTN may need to adopt a large data compression rate in consideration of the lowest communication quality that can be assumed.

Therefore, one objective to be achieved by the example embodiment disclosed in the present description is to provide an improved DTN node, a method, and a medium for being possible to adjust amount of data delivered in the DTN in accordance with the local communication status in the DTN. Other objectives or targets and novel features will be clarified in the description and the appended drawings.

Solution to Problem

In an example embodiment, a Delay-Tolerant network (DTN) node includes: a memory; and a processor coupled to the memory and configured to execute data transfer processing for a DTN. The data transfer processing includes:

(a) receiving a plurality of bundles to be transferred to a same destination node on the DTN, each of the plurality of bundles including any one of a plurality of data segments acquired by dividing data of a content;

(b) deleting a part of the bundles from among the plurality of bundles without transferring to any other node or compressing a data size of a payload of the part of the bundles in accordance with a communication status of the DTN; and (c) transmitting either a rest of the bundles excluding the deleted part of the bundles or the plurality of bundles including the part of the bundles having the compressed payloads to the DTN for transmitting to the destination node.

In an example embodiment, a data transfer method performed by a Delay-Tolerant network (DTN) includes:

(a) receiving a plurality of bundles to be transferred to a same destination node on the Delay-Tolerant network (DTN), each of the plurality of bundles including any one of a plurality of data segments acquired by dividing data of a content;

(b) deleting a part of the bundles from among the plurality of bundles without transferring to any other node or compressing a data size of a payload of the part of the bundles in accordance with a communication status of the DTN; and (c) transmitting either a rest of the bundles excluding the deleted part of the bundles or the plurality of bundles including the part of the bundles having the compressed payloads to the DTN for transmitting to the destination node.

In an example embodiment, a non-transitory computer readable medium stores a program. The program includes a group of instructions for causing a computer to perform the above-mentioned data transfer method.

In an example embodiment, a Delay-Tolerant network (DTN) node includes: a memory; and a processor coupled to the memory and configured to execute data transmission processing for a DTN. The data transmission processing includes:

(a) dividing data of a content to be transmitted to a destination node in the DTN into a plurality of data segments;

(b) generating a plurality of bundles having payloads storing any of the plurality of data segments;

(c) generating a configuration information bundle storing configuration information indicating each attribute of the plurality of bundles; and (d) transmitting the plurality of bundles and the configuration information bundle to the Delay-Tolerant network (DTN) for transmitting the content to the destination node.

In an example embodiment, a data transmission method performed by a Delay-Tolerant network (DTN) includes:

(a) dividing data of a content to be transmitted to a destination node in the DTN into a plurality of data segments;

(b) generating a plurality of bundles having payloads storing any of the plurality of data segments;

(c) generating a configuration information bundle storing configuration information indicating each attribute of the plurality of bundles; and (d) transmitting the plurality of bundles and the configuration information bundle to the DTN for transmitting the content to the destination node.

In an example embodiment, a non-transitory computer readable medium stores a program. The program includes a group of instructions for causing a computer to perform the above-mentioned data transmission method.

Advantageous Effects of Invention

According to the above-described example embodiment, an improved DTN node, a method, and a program for being possible to adjust amount of data delivered in the DTN in accordance with the local communication status in the DTN can be provided.

BRIEF DESCRIPTION OF DRAWINGS

FIG. 7 is a diagram illustrating an example of the procedure of deleting bundles or compressing payloads by the DTN node (the intermediate node) according to the first example embodiment.

FIG. 8 is a diagram illustrating an example of the bundle restoration procedure by the DTN node (the intermediate node) according to the first example embodiment.

DESCRIPTION OF EMBODIMENTS

The following will describe a specific example embodiment in detail with reference to the drawings. The same or equivalent elements are appended with the same signs throughout the drawings, for which redundant explanations are omitted as necessary to clarify the explanation.

First Example Embodiment

Figure 1:
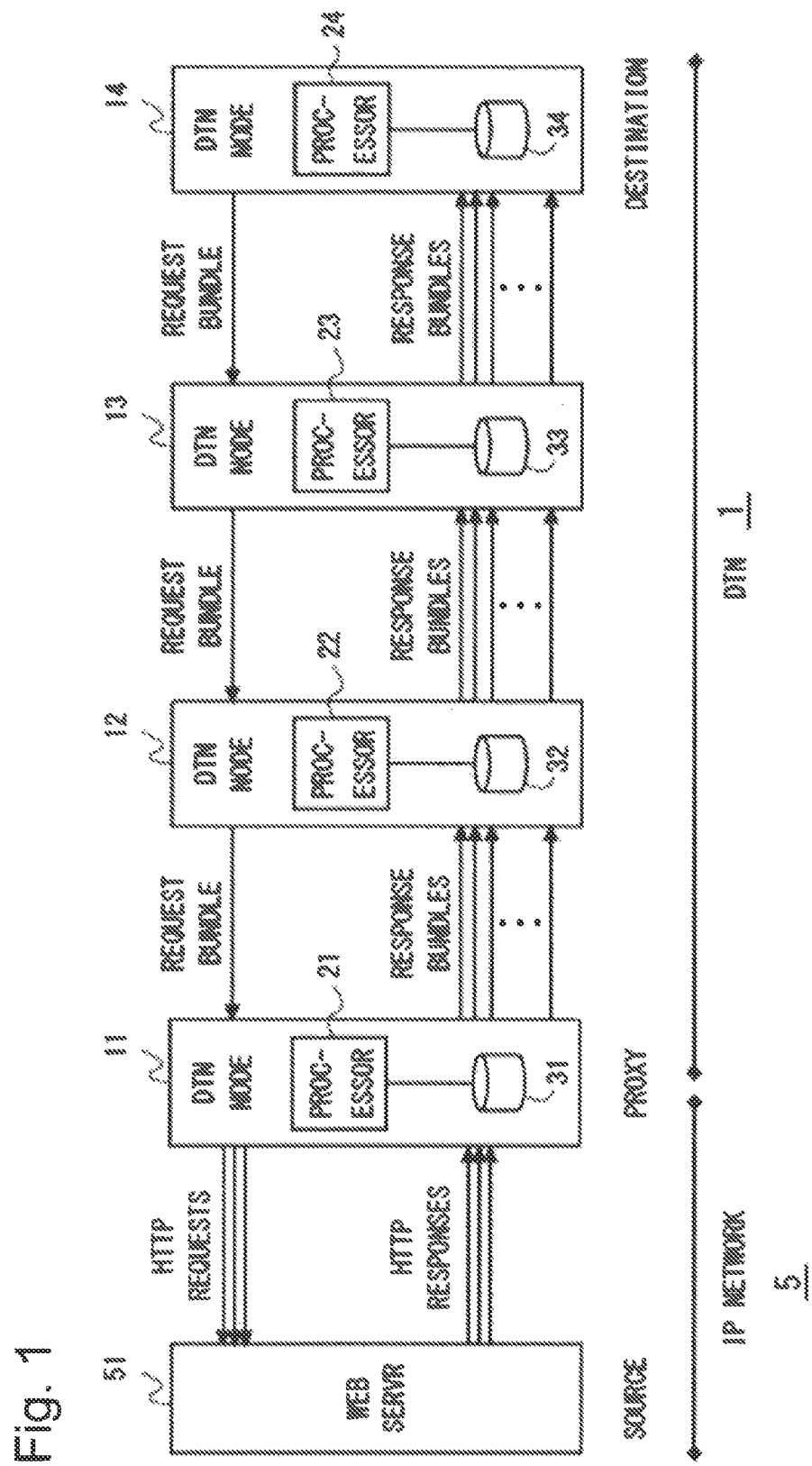
FIG. 1 is a block diagram illustrating an example of a DTN configuration according to a first example embodiment.

FIG. 1 is a block diagram illustrating an example of the configuration example of a Delay/Disruption/Disconnect Tolerant Network (DTN) 1 according to a first example embodiment. The DTN 1 illustrated in FIG. 1 includes four DTN nodes 11 to 14. It should be noted that the number of DTN nodes included in the DTN 1 illustrated in FIG. 1 is an example. The DTN 1 may include three or less DTN nodes, or may include five or more DTN nodes.

The DTN nodes 11 to 14 achieve delivery of messages between a transmission source node and a destination node by autonomously relaying bundles to one another. The DTN nodes 11 to 12 respectively have processors 21 to 24 and memories 31 to 34. The memories 31 to 34 are used to temporarily retain the bundles delivered over the DTN 1, contributing a store and forward operation for the bundles. The memories 31 to 34 may also be used for storing software that is executed by the processors 21 to 24. The memories 31 to 34 are each configured by a combination of transitory memories and non-transitory memories. The transitory memory may be, for example, a static random access memory (SRAM), a dynamic RAM (DRAM), or a combination thereof. The non-transitory memory may be, for example, a mask read only memory (MROM), a programmable ROM (PROM), a flash memory, a hard disk drive, or a combination thereof.

The processors 21 to 24 are respectively coupled to the memories 31 to 34. The processors 21 to 24 operate as bundle routers that transfer bundles by executing a variety of software (computer programs). That is, the processors 21 to 24 perform generation of bundles, routing and forwarding of bundles, managing of the memories 31 to 34 as bundle buffers (storing bundles, deleting bundles), and the like. Each of the processors 21 to 24 may include one or a plurality of processors. Each of the processors 21 to 24 may be, for example, a Digital Signal Processor (DSP), a microprocessor, a Micro-Processing Unit (MPU), a Central Processing Unit (CPU), or a combination thereof.

This example assumes a case where a content relating to a web transaction based on a Hypertext Transfer Protocol (HTTP) are transmitted from a web server in an IP network 5 to the DTN node 14 via the DTN 1. As illustrated in FIG. 1, the DTN node 11 is located at a boundary between the DTN 1 and the IP network 5. The DTN node 11 operates as a gateway that transfers data between the DTN 1 and the IP network 5. The DTN node 11 further operates as a proxy (a web proxy) that performs web transactions (HTTP transactions) with the web server 51 in place of the DTN node 14.

The DTN nodes 11 to 14 illustrated in FIG. 1 operate as follows so that the DTN node 14 acquires a web content. First, the DTN node 14 transmits a bundle (a request bundle), which has a payload storing a message for requesting a web content. The destination of the request bundle is the DTN node 14. The DTN node 14 may use HTTP to request a web content, or may use another protocol, such as, a special content request protocol for DTN. The request bundle transmitted from the DTN node 14 reaches the DTN node 11 via the DTN nodes 12 and 13. That is, the DTN nodes 12 and 13 operate as intermediate nodes contributing to the delivery of the request bundle.

In response to reception of the request bundle from the DTN node 14, the DTN node 11 as a proxy performs HTTP transactions with the web server 51. In general, the HTTP transactions include transmission of a plurality of HTTP requests and reception of a plurality of HTTP responses. That is, first, the DTN node 11 as a proxy transmits an HTTP request for requesting Hypertext Markup Language (HTML) data and receives an HTTP response that includes the HTML data. Next, the DTN node 11 analyzes the received HTML data, and transmits additional one or a plurality of HTTP requests for acquiring resource data (for example, image, audio, or video) specified by a Uniform Resource Identifier (URI) written in the HTML data. A destination of the additional one or a plurality of HTTP requests may be a different another server than the web server 51. The DTN node 11 further receives one or a plurality of HTTP responses that are replied to the additional one or a plurality of HTTP requests, and acquires the resource data (for example, image, audio, or video) thereby.

Further, the DTN node 11 generates a plurality of bundles (response bundles) for transmitting a web content, that is, HTML data and resource data (for example, image, audio, or video), to the DTN node 14. The payloads of a plurality of response bundles store data segments that are acquired by dividing the web content. The plurality of response bundles are transmitted from the DTN node 11 and reach the DTN node 14 via the intermediate nodes (that is, the DTN nodes 12 and 13). The DTN node 14 retrieves and uses the web content (HTML data and resource data) from the received response bundles.

It should be noted that, as is widely known, a general web proxy can cache web contents that are acquired from prior web access and reply the cached web contents at subsequent web access. Thus, the DTN node 11 as a proxy may cache web contents that are acquired by prior web access in the memory 31 and, then, transmit the cached web contents to the DTN node 14 in response to the request from the DTN node 14.

Figure 2:
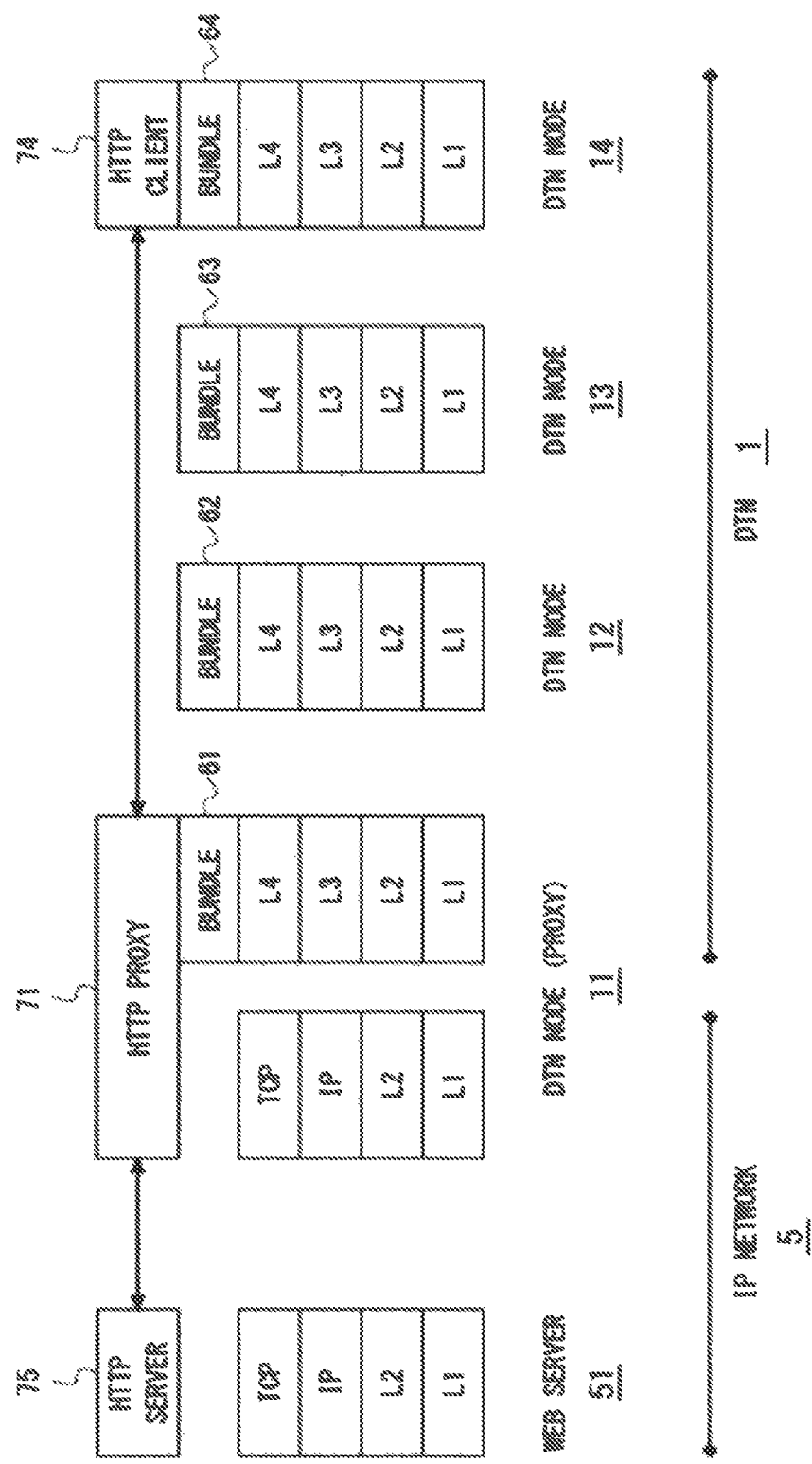
FIG. 2 is a diagram illustrating an example of a protocol stack of the DTN according to the first example embodiment.

FIG. 2 is a diagram illustrating an example of a protocol stack of the DTN 1. The bundle protocol agent software 61 to 64 is respectively executed by the processors 21 to 24 of the DTN nodes 11 to 14, and causes the processors 21 to 24 to perform communications of a store and forward approach based on the bundle protocol thereby. The bundle protocol defines a format of bundles (PDU) that is necessary for communications of a store and forward approach. Further, the bundle protocol may define rules, such as, the routing algorithm of bundles and the management of bundle buffers. Known bundle routing algorithms for DTN include Epidemic routing, Spray and Wait, PROPHET, and the like. In these routing algorithms, each DTN node manages information called a summary vector. The summary vector indicates an identifier of a bundle that is stored in the bundle buffer of each DTN node. Each DTN node exchanges summary vectors in communication with adjacent DTN nodes, identifies bundles that the DTN node does not have, and acquires the identified bundles from the adjacent DTN nodes.

HTTP proxy software 71 is executed by the processor 21 of the DTN node 11, and causes the processor 21 to perform HTTP proxy processing. The HTTP proxy processing includes communicating with HTTP client software 74, communicating with HTTP server software 75, and caching web contents.

HTTP client software 74 is executed by the processor 24 of the DTN node 14, and causes the processor 24 to perform web access (acquisition of web contents) based on HTTP. It should be noted that, as described above, the DTN node 14 may use a protocol, which is different from HTTP (for example, a special content request protocol for DTN), to acquire web contents.

Figure 3:
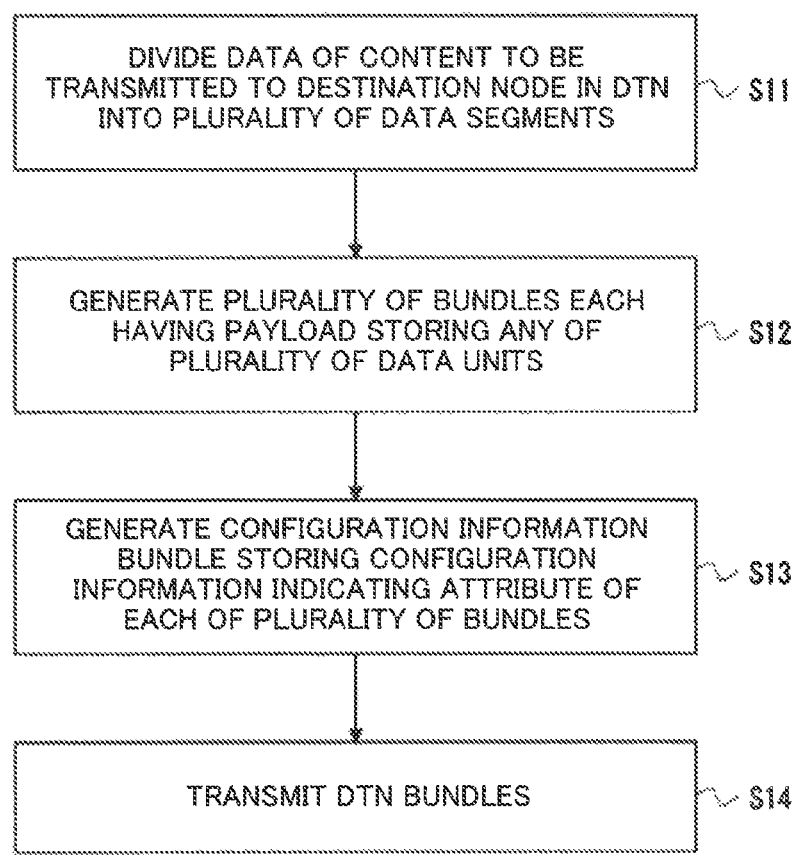
FIG. 3 is a flowchart illustrating an example of a bundle generation procedure by a DTN node (a proxy node) according to the first example embodiment.

Next, the following will describe a specific example of a bundle generation operation at the DTN node 11 and a bundle relay operation at the intermediate nodes (that is, the DTN nodes 12 and 13). FIG. 3 is a flowchart illustrating an example of a bundle generation procedure performed by the DTN node 11. The procedure of FIG. 3 is performed by the processor 21 executing bundle protocol agent software 61.

At step S11, the DTN node 11 (that is, the processor 21) divides the data of a content (for example, a web content) to be transmitted to the destination node (for example, the DTN node 14) in the DTN into a plurality of data segments. The plurality of data segments may have the same or different data sizes. At step S12, the DTN node 11 generates a plurality of bundles, each of which has the payload storing any of the plurality of data units.

At step S13, the DTN node 11 generates a configuration information bundle that stores configuration information indicating each attribute of the plurality of bundles generated at step S12. The configuration information or each bundle's attribute stored in the configuration information is used for selecting a bundle to be deleted or a bundle, of which payload is to be compressed, at an intermediate node (that is, the DTN nodes 12 and 13) as will be described later. As an example, each bundle's attribute may indicate whether or not deletion of the bundle or compression of the payload is allowed for each of the bundles at an intermediate node in the DTN 1. As an example, each bundle's attribute may indicate the classification of a data segment (that is, a fragment of the content) stored in the payload. In particular, each bundle's attribute may indicate whether the data segment stored in the payload corresponds to HTML data or resource data (for example, image, audio, or video). Each bundle's attribute may further indicate which one of a plurality of classifications of resource data (for example, image, audio, or video) the data segment stored in the payload corresponds to.

The configuration information may further include information for identifying a plurality of bundles that carry a plurality of data segments relating to a single content (for example, a web content including HTML data and resource data). In particular, the configuration information may specify respective identifiers (bundle IDs) of a plurality of bundles.

The configuration information may further be rewritten at an intermediate node in response to deletion of the bundle or compression of a payload at the intermediate node (that is, the intermediate nodes 12 and 13) in the DTN 1. Alteration of a bundle or the payload of a bundle includes at least one of deletion of the bundle, deletion of the payload, and rewriting of the payload data. In particular, the intermediate node may record the bundle ID of a bundle as a subject of deletion or payload compression in the configuration information. In this way, other DTN nodes can identify the bundle that is subjected to deletion or payload compression at any of the nodes in the DTN 1.

Returning to FIG. 3, the description is continued. At step S14, the DTN node 11 transmits a plurality of bundles that carry the data segments of the content and the configuration information bundle to the DTN 1 for transmitting to the DTN node 14.

Figure 4:
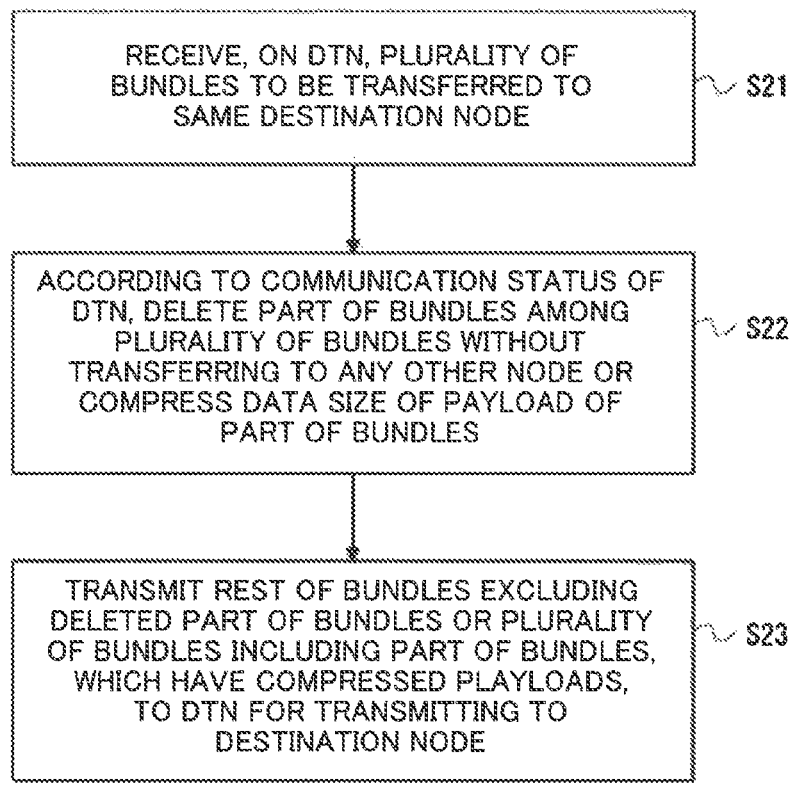
FIG. 4 is a flowchart illustrating an example of a procedure of deleting bundles or compressing payloads by a DTN node (an intermediate node) according to the first example embodiment.

FIG. 4 is a flowchart illustrating an example of a procedure of bundle deletion or payload compression at the intermediate node (the DTN nodes 12 and 13). The procedure of FIG. 4 is performed by the processor 22 or 23 executing bundle protocol agent software 62 or 63.

At step S21, the DTN node 12 (13) receives, on the DTN 1, a plurality of bundles to be transferred to the same destination node (the DTN node 14). The plurality of bundles include a plurality of bundles that carry the data segments of the content and the configuration information bundle, which are described with reference to FIG. 3.

At step S22, in accordance with the communication status of the DTN 1, the DTN node 12 (13) deletes a part of the bundles among the plurality of bundles without transferring to any other node or compresses the data size of the payload of a part of the bundles. As an example, compression of the data size of a payload may be performed by replacing the data segment stored in the payload with dummy data. The data size of the dummy data should be sufficiently small (for example, zero). As another example, compression of the data size of a payload may be performed by deleting the data segment stored in the payload. As still another example, when the data segment stored in a payload is compressible data, such as image, audio, or video, the compression of the data size of the payload may perform compression processing for the data segment.

In step S22, the communication status of the DTN 1 may include at least one of local communication quality in the DTN 1 and the success prospect of delivery (Delivery Predictability) of the plurality of bundles to the destination node (the DTN node 14). Alternatively, the communication status of the DTN 1 may include history of local communication quality or delivery predictability, namely, past communication quality or past delivery predictability, of the DTN 1. This is because the measurement values of the communication quality or the delivery predictability is in general acquired by observing the history of the past communication results. Further, to address a case of cyclic degradation of the communication quality of the DTN 1 (for example, at specific time or specific day of week), the communication status of the DTN 1 may include the history of the communication quality of the DTN 1 that is long enough to detect the cyclic changes of the communication quality.

The local communication quality of the DTN 1 may be evaluated, for example, using RSSI, SNR, BER, or throughput at the intermediate node (the DTN node 12 or 13). That is, the DTN node 12 or 13 as the intermediate node may delete or compress a part of a plurality of bundles when the DTN node 12 or 13 determines that appropriate delivery of all the plurality of bundles to the destination node is difficult due to low local communication quality or delivery predictability, which the DTN node 12 or 13 recognizes, of the past or present DTN 1. The DTN node 12 or 13 may delete or compress a part of a plurality of bundles when the local communication quality or delivery predictability, which the DTN node 12 or 13 recognizes, of the past or present DTN 1 is lower than a predetermined threshold level.

In step S22, the intermediate node (the DTN node 12 or 13) may determine a bundle to be subjected to deletion or compression based on the bundle's attribute indicated by the configuration information stored in the configuration information bundle. As an example, the intermediate node (the DTN node 12 or 13) may handle a bundle, of which bundle deletion or payload compression is allowed in the bundle's attribute, as a subject of deletion or compression. As another example, the intermediate node (the DTN node 12 or 13) may handle a bundle other than the configuration information bundle and bundles that store HTML data, namely, a bundle that stores resource data, such as image and video, as a subject of deletion or compression. In other words, the intermediate node (the DTN node 12 or 13) may determine the importance of data stored in the payload of each bundle, based on each bundle's attribute indicated by the configuration information bundle. Then, the intermediate node (the DTN node 12 or 13) should exclude the bundles that carry relatively important data (for example, configuration information and HTML data) from the subject of deletion or compression and handle the bundles that carry relatively unimportant data (for example, resource data, such as image and video) as the subject of deletion or compression.

At step S22, the intermediate node (the DTN node 12 or 13) may record the bundle ID of the bundle determined as the subject of deletion or payload compression in the configuration information. In this way, other DTN nodes can identify a bundle that is subjected to deletion or payload compression at any of the nodes in the DTN 1.

At step S23, the DTN node 12 (13) transmits either the rest of the bundles excluding the deleted part of the bundles or the plurality of bundles including a part of the bundles which have compressed payload to the DTN 1 for transmitting to the destination node (the DTN node 14).

Figure 5:
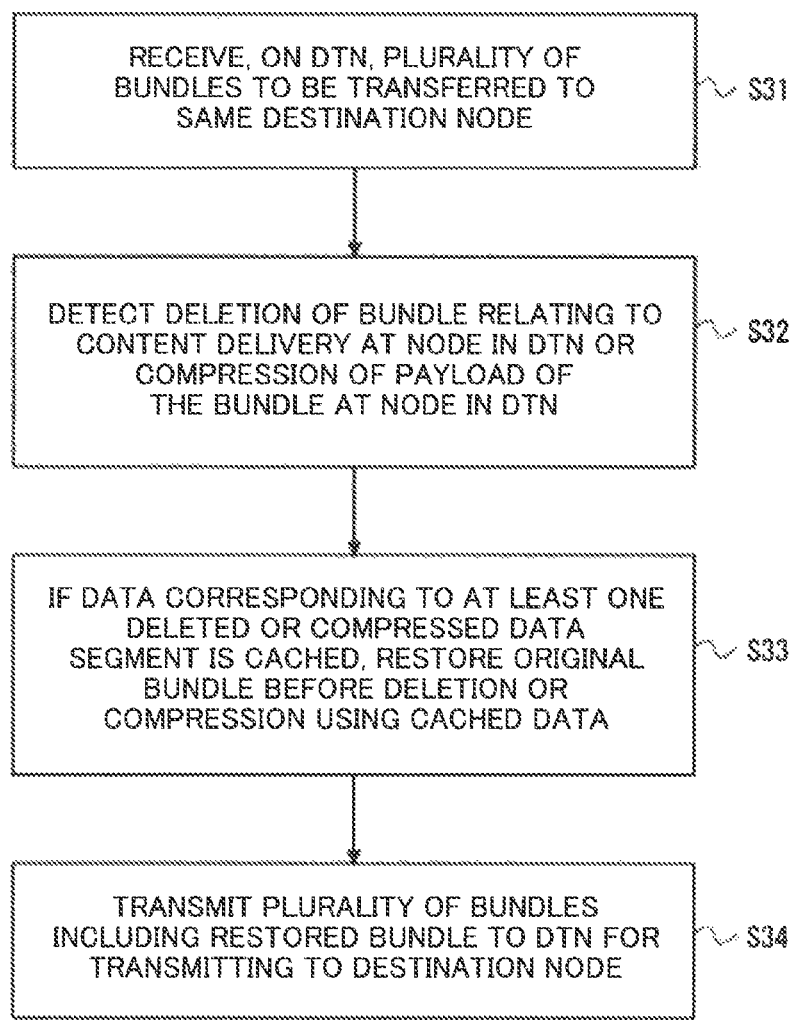
FIG. 5 is a flowchart illustrating an example of a bundle restoration procedure by the DTN node (the intermediate node) according to the first example embodiment.

FIG. 5 is a flowchart illustrating an example of a bundle restoration procedure at the intermediate node (the DTN nodes 12 and 13). The procedure of FIG. 5 is performed by the processor 22 or 23 executing the bundle protocol agent software 62 or 63.

At step S31, the DTN node 13 (12) receives, on the DTN 1, a plurality of bundles to be transferred to the same destination node (the DTN node 14). The plurality of bundles include a plurality of bundles that carry the data segments of a content and the configuration information bundle, which are described with reference to FIG. 3. It should be noted that the part of the plurality of bundles that carry the data segments may be deleted or compressed at another intermediate node in accordance with the procedure that is described with reference to FIG. 4.

At step S32, the DTN node 13 (12) detects that a bundle relating to the delivery of the content is deleted at any of the nodes in the DTN 1 or the payload of the bundle is compressed at any of the nodes in the DTN 1. The detection may be performed, for example, by referring to the bundle ID of the bundle that is subjected to deletion or compression recorded in the configuration information bundle.

At step S33, when the DTN node 13 (12) caches data corresponding to at least one deleted or compressed data segment in the memory 33 (32) of itself, the DTN node 13 (12) restores the original bundle prior to deletion or compression by using the cached data.

At step S33, the DTN node 13 (12) may determine whether to restore the bundle or not based on the communication status of the DTN 1. That is, the DTN node 13 (12) may restore the original bundle prior to deletion or compression by using the cached data when the DTN node 13 (12) determines that the probability of appropriately delivering the plurality of bundles including the bundle after restoration to the destination node is high due to high local communication quality or high delivery predictability that the DTN node 13 (12) recognizes. The DTN node 13 (12) may restore the bundle, for example, when the local communication quality or delivery predictability, which the DTN node 13 (12) recognizes, of the DTN 1 exceeds a predetermined threshold level.

At step S34, the DTN node 13 (12) transmits the plurality of bundles including the restored bundle to the DTN 1 for transmitting to the destination node (the DTN node 14).

Figure 6:
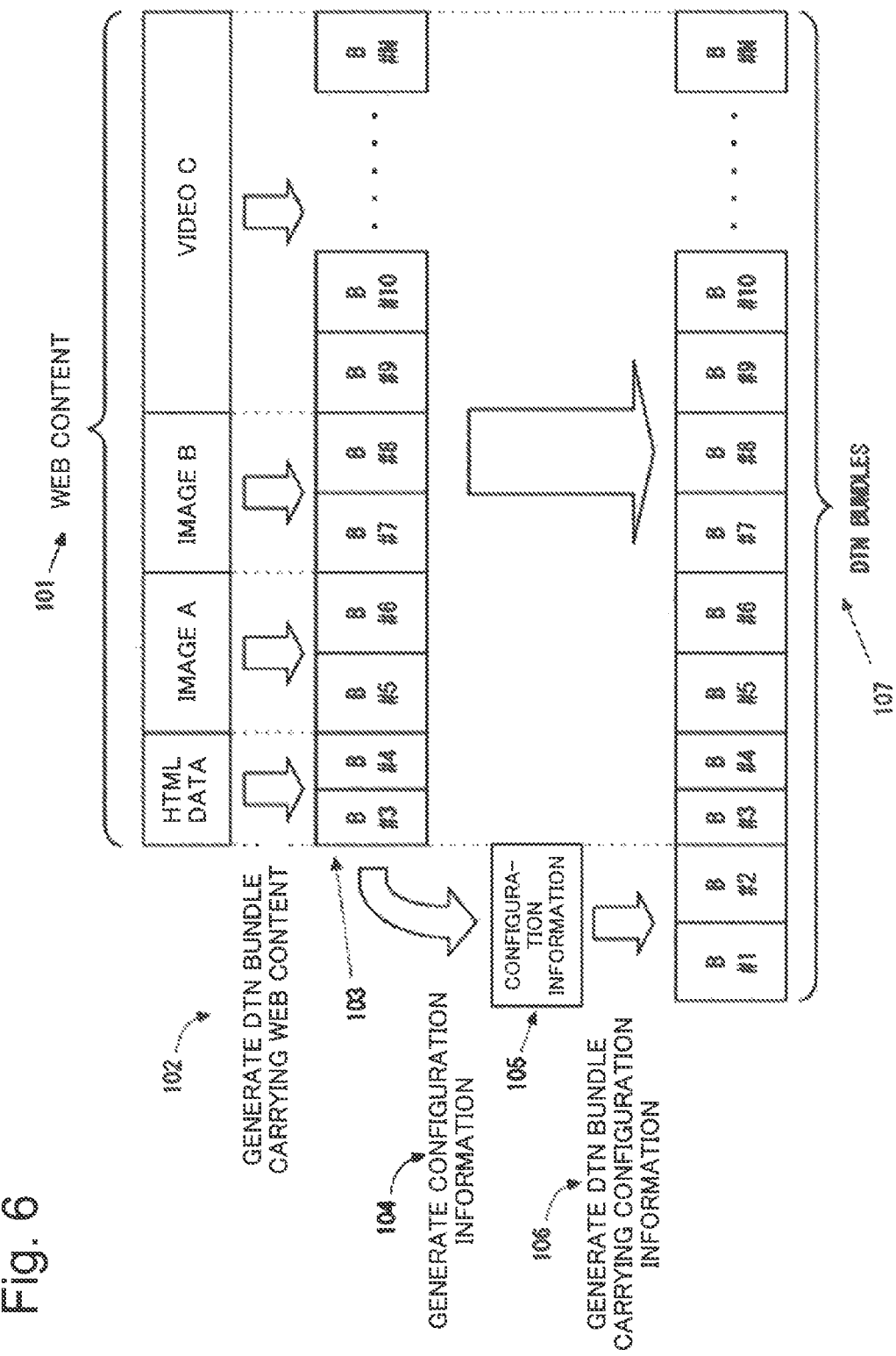
FIG. 6 is a diagram illustrating an example of a bundle generation procedure by the DTN node (the proxy node) according to the first example embodiment.

Next, with reference to FIGS. 6 to 8, the following will describe a specific example of the operations of the DTN nodes described with reference to FIGS. 3 to 5. FIG. 6 illustrates a specific example of a bundle generation operation performed by the DTN node 11. In the example of FIG. 6, a web content 101 is configured with HTML data, images A and B, and a video C. The DTN node 11 divides the web content 101 into a plurality of data segments and generates a plurality of bundles 103 (102). The plurality of bundles 103 include (N−2) number of bundles #3 to #N. Next, the DTN node 11 generates configuration information 105 of the plurality of bundles 103 that carry the web content 101 (104). The configuration information 105 indicates respective attributes of the plurality of bundles 103. The configuration information 105 may include information for identifying the plurality of bundles 103. In particular, the configuration information 105 may specify respective identifiers (bundle IDs) of the plurality of bundles 103. Further, the DTN node 11 generates a configuration information bundle that carries the configuration information 105 (105).

In the example of FIG. 6, the configuration information 105 is divided into two segments that are respectively stored in the payloads of the bundles #1 and #2. Then, the DTN node 11 transmits N number of bundles including the configuration information bundles #1 and #2 that carry the configuration information 105 and the bundles #3 to #N that carry the web content 101 to the DTN 1 for transmitting to the DTN node 14 (107).

FIG. 7 illustrates a specific example of bundle deletion or payload compression that is performed by the DTN node 12. In the example of FIG. 7, the DTN node 12 receives N number of bundles #1 to #10 from the DTN node 11 (201). Next, the DTN node 12 retrieves the configuration information 202 from the configuration information bundles #1 and #2. The DTN node 12 deletes the bundles #5 to #N that carry the resource data (that is, images A and B, as well as, a video C) or compresses the payloads of these bundles by referring the configuration information 202 (203). Then, the DTN node 12 transmits either the rest of the bundles #1 to #4 excluding the deleted part of the bundles #5 to #N or the bundles #1 to #N including the part of the bundles #5 to #N, which have compressed payloads, to the DTN 1 for transmitting to the DTN node 14 (204).

FIG. 8 illustrates a specific example of a bundle restoration procedure performed by the DTN node 13. In the example of FIG. 8, the DTN node 13 receives either the rest of the bundles #1 to #4 excluding the deleted part of the bundles #5 to #N or the bundles #1 to #N including the part of the bundles #5 to #N, which have compressed payloads, from the DTN node 12 (301). Next, the DTN node 13 retrieves the configuration information 302 from the configuration information bundles #1 and #2. The configuration information 302 records that the bundles #5 to #N are deleted or compressed by the DTN node 12. In the example of FIG. 8, the DTN node 13 caches the image A corresponding to a fragment of the web content 101 in the memory 33. Accordingly, the DTN node 13 restores the bundles #5 and #6 by using the cached image A (303). Then, the DTN node 13 transmits either the rest of the bundles #1 to #6 excluding the deleted part of the bundles #7 to #N or the bundles #1 to #N including the part of the bundles #7 to #N, which have compressed payloads, to the DTN 1 for transmitting to the DTN node 14 (304).

As is understood from the above description, in the present example embodiment, the intermediate node (for example, the DTN node 12 or 13) that is involved in delivery of DTN bundles to the destination node (for example, the DTN node 14) receives a plurality of bundles that carry a plurality of data segments acquired by dividing the data of a content (for example, a web content). Then, the intermediate node is configured to delete a part of the bundles from among the plurality of bundles without transferring to another node or compress the data size of the payload of the part of the bundles in accordance with the communication status of the DTN 1. In this way, the intermediate node (for example, the DTN node 12 or 13) can reduce the data amount to be transmitted in the DTN 1 based on the local communication status, which the intermediate node recognizes, in the DTN 1. Accordingly, the present example embodiment can adjust the data amount that is delivered in the DTN 1 in accordance with the local communication status in the DTN 1.

As an example, as described with the present example embodiment, the DTN node 11 may generate and transmit the configuration information bundle that stores the configuration information indicating the attributes of a plurality of DTN bundles. Further, the configuration information bundle may record the identifier of a bundle that is subjected to deletion or compression at the intermediate node. In this way, the intermediate node (for example, the DTN node 12 or 13) and the destination node (for example, the DTN node 14) in the DTN 1 can easily recognize the bundle that can be a subject of deletion or compression. Further, the intermediate node (for example, the DTN node 12 or 13) and the destination node (for example, the DTN node 14) in the DTN 1 can easily recognize the bundle that is deleted or compressed by any other DTN node. In particular, a deleted bundle can be easily recognized.

As an example, as described with the present example embodiment, the intermediate node (for example, the DTN node 12 or 13) in the DTN 1 may restore the bundle that is deleted or compressed by any other DTN node by using data that is cached in the intermediate node itself. This restoration may preferably be performed under condition that the local communication status of the DTN 1 is satisfactory. In this way, a content that is lost or degraded due to locally deteriorated communication quality in a certain area in the DTN 1 can be restored ex post.

OTHER EXAMPLE EMBODIMENTS

The first example embodiment describes an example of generating the configuration information bundle that carries the configuration information indicating the attributes of DTN bundles. However, the DTN node 11 does not need to generate the configuration information bundle. For example, the DTN node 11 may record the respective attributes of a plurality of bundles, which store the fragments of a contents (data segments) in the payload, in the headers of the respective bundles.

The restoration of bundles that is described with the first example embodiment may not be performed. For example, the restoration of bundles may not be performed when the DTN employs an architecture where each DTN node does not cache contents.

The first example embodiment describes an example where the DTN node 11 operates as a web proxy and generates a plurality of bundles for carrying a web content. However, it is appreciated that application of the technical idea described in the first example embodiment is not limited to the example of web access. The DTN node 11 may not be a proxy. The technical idea described in the first example embodiment can be widely applied when contents are transmitted from a transmission source node to a destination node over a DTN.

The bundle generation procedure, bundle deletion or compression procedure, and bundle restoration procedure described with the first example embodiment may be realized by causing a computer system to execute a program. In particular, one or a plurality of programs including groups of instructions for causing a computer system to perform an algorithm that is described herein using the sequence diagrams and the like may be created and the programs may be supplied to a computer system. For example, as described above, the bundle protocol agent software 61 to 63 including groups of instructions for causing a computer to perform these procedures may be created.

Such a program can be stored using various types of non-transitory computer readable medium and be supplied to a computer. The non-transitory computer readable medium includes various types of tangible storage medium. Examples of the non-transitory computer readable medium include a magnetic recording medium (for example, a flexible disk, a magnetic tape, and a hard disk drive), a magneto optical recording medium (for example, an optical magnetic disk), a Compact Disc Read Only Memory (CD-ROM), a CD Recordable (CD-R), a CD-Re-Writable (CD-R/W), and a semiconductor memory (for example, a mask ROM, a Programmable ROM (PROM), an Erasable PROM (EPROM), a flash ROM, and a Random Access Memory (RAM)). Alternatively, the program may be supplied to the computer through various types of transitory computer readable medium. Examples of the transitory computer readable medium include electric signals, optical signals, and electromagnetic waves. The transitory computer readable medium can supply the program to the computer via a wired channel, such as electric cables or optical fibers, or a wireless channel.

Further, the above described example embodiment is only an example of application of the technical idea provided by the Inventor. That is, it will be appreciated that the technical idea can be modified in a variety of ways without limitation to the above described example embodiment.

This application is based upon and claims the benefit of priority from Japanese patent application No. 2014-150407, filed on Jul. 24, 2014, the disclosure of which is incorporated herein in its entirety by reference.

REFERENCE SINGS LIST

1 DTN
5 IP network
11 to 14 DTN node
21 to 24 Processor
31 to 34 Memory
61 to 64 Bundle protocol agent software
71 HTTP proxy software
74 HTTP client software
75 HTTP server software

The invention claimed is:
1. A Delay-Tolerant network (DTN) node used in a Delay-Tolerant network (DTN) comprising:
   a memory; and
   a processor coupled to the memory and configured to execute data transmission processing for the DTN,
   the data transmission processing comprising:
   dividing data of a content to be transmitted to a destination node in the DTN into a plurality of data segments;
   generating a plurality of bundles having payloads storing any of the plurality of data segments;
   generating a configuration information bundle storing configuration information indicating each attribute of the plurality of bundles; and
   transmitting the plurality of bundles and the configuration information bundle to the DTN for transmitting the content to the destination node,
   wherein the attribute indicates whether or not compression of a data size of the payload of each bundle is allowed at an intermediate node in the DTN according to the communication status of the DTN.
2. The DTN node according to claim 1, wherein
   the compressing is performed by replacing the data segment stored in the payload with dummy data.
3. The DTN node according to claim 1, wherein
   the compressing is performed by deleting the data segment stored in the payload.
4. The DTN node according to claims 1, wherein
   the attribute indicates whether or not deletion of each bundle without transferring to any other node is allowed at an intermediate node in the DTN.

5. The DTN node according to claims 1, wherein
the content is a content relating to a web transaction based on Hypertext-Transfer-Protocol (HTTP) and includes Hypertext-Markup-Language (HTML) data and resource data specified by Uniform-Resource-Identifier (URI) written in the HTML data, wherein
the attribute indicates whether each data segment included in the payload of each of the plurality of bundles corresponds to the HTML data or the resource data.

6. The DTN node according to claim 5, wherein
the attribute indicates whether or not each data segment included in the payload of each of the plurality of bundles corresponds to image data included in the resource data.

7. A data transmission method performed by a Delay-Tolerant network (DTN) node in a Delay-Tolerant network (DTN), comprising:
dividing data of a content to be transmitted to a destination node in the DTN into a plurality of data segments;
generating a plurality of bundles having payloads storing any of the plurality of data segments;
generating a configuration information bundle storing configuration information indicating each attribute of the plurality of bundles; and
transmitting the plurality of bundles and the configuration information bundle to the DTN for transmitting the content to the destination node,
wherein the attribute indicates whether or not compression of a data size of the payload of each bundle is allowed at an intermediate node in the DTN according to the communication status of the DTN.

8. The data transmission method according to claim 7, wherein
the attribute indicates whether or not compression of a data size of the payload of each bundle is allowed at an intermediate node in the DTN.

9. The data transmission method according to claim 7, wherein
the attribute indicates whether or not deletion of each bundle without transferring to any other node is allowed at an intermediate node in the DTN.

10. The data transmission method according to claims 7, wherein
the content is a content relating to a web transaction based on Hypertext-Transfer-Protocol (HTTP) and includes Hypertext-Markup-Language (HTML) data and resource data specified by Uniform-Resource-Identifier (URI) written in the HTML data, wherein
the attribute indicates whether each data segment included in the payload of each of the plurality of bundles corresponds to the HTML data or the resource data.

11. The data transmission method according to claim 10, wherein
the attribute indicates whether or not each data segment included in the payload of each of the plurality of bundles corresponds to image data included in the resource data.

12. A non-transitory computer readable medium storing a program, the program causing a computer in a Delay-Tolerant network (DTN) to perform a method, the method comprising:
dividing data of a content to be transmitted to a destination node in the DTN into a plurality of data segments;
generating a plurality of bundles having payloads storing any of the plurality of data segments;
generating a configuration information bundle storing configuration information indicating each attribute of the plurality of bundles; and
transmitting the plurality of bundles and the configuration information bundle to the DTN for transmitting the content to the destination node,
wherein the attribute indicates whether or not compression of a data size of the payload of each bundle is allowed at an intermediate node in the DTN according to the communication status of the DTN.

* * * * *